(12) United States Patent
Matsuzaki

(10) Patent No.: US 10,187,532 B2
(45) Date of Patent: Jan. 22, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 15/247,641

(22) Filed: Aug. 25, 2016

(65) Prior Publication Data

US 2017/0064095 A1    Mar. 2, 2017

(30) Foreign Application Priority Data

Sep. 2, 2015    (JP) .................................. 2015-173287

(51) Int. Cl.
  *H04N 1/00*    (2006.01)
  *H04N 1/60*    (2006.01)

(52) U.S. Cl.
  CPC ..... *H04N 1/00037* (2013.01); *H04N 1/00015* (2013.01); *H04N 1/00029* (2013.01); *H04N 1/00045* (2013.01); *H04N 1/00079* (2013.01); *H04N 1/00082* (2013.01); *H04N 1/00411* (2013.01); *H04N 1/6016* (2013.01); *H04N 1/6033* (2013.01); *H04N 2201/0094* (2013.01)

(58) Field of Classification Search
  USPC ........................................................ 358/504
  See application file for complete search history.

(56) References Cited

U.S. PATENT DOCUMENTS

| 5,065,444 A * | 11/1991 | Garber ...................... G06T 5/20 |
| | | 348/E5.035 |
| 2003/0158608 A1* | 8/2003 | Ishikawa ................... G06T 1/20 |
| | | 700/2 |
| 2005/0157327 A1* | 7/2005 | Shoji .................... G06K 15/408 |
| | | 358/1.14 |
| 2012/0154837 A1* | 6/2012 | Yamazaki .............. B41J 2/2142 |
| | | 358/1.9 |
| 2012/0162479 A1* | 6/2012 | Okamura ............. H04N 5/2621 |
| | | 348/239 |
| 2015/0138588 A1* | 5/2015 | Matsuzaki ............... H04N 1/00 |
| | | 358/1.14 |

FOREIGN PATENT DOCUMENTS

JP    2001203831 A    7/2001

OTHER PUBLICATIONS

Takayuki et al., Method and System for Remotely Diagnosing Image Output Device, Jul. 27, 2001; Machine Translated Japanese Patent Application Publication; JP2001-203831, all Pages.*

* cited by examiner

*Primary Examiner* — Ngon Nguyen
(74) *Attorney, Agent, or Firm* — Canon U.S.A., Inc. IP Division

(57) ABSTRACT

An image processing apparatus includes a clipping unit that clips an arbitrary area from image data acquired by reading a chart output from an image forming unit, an acquisition unit that acquires a signal value relating to a plurality of positions in a scanning direction of the area clipped by the clipping unit, and a transmission unit that transmits information about the clipped area and the acquired signal value.

10 Claims, 13 Drawing Sheets

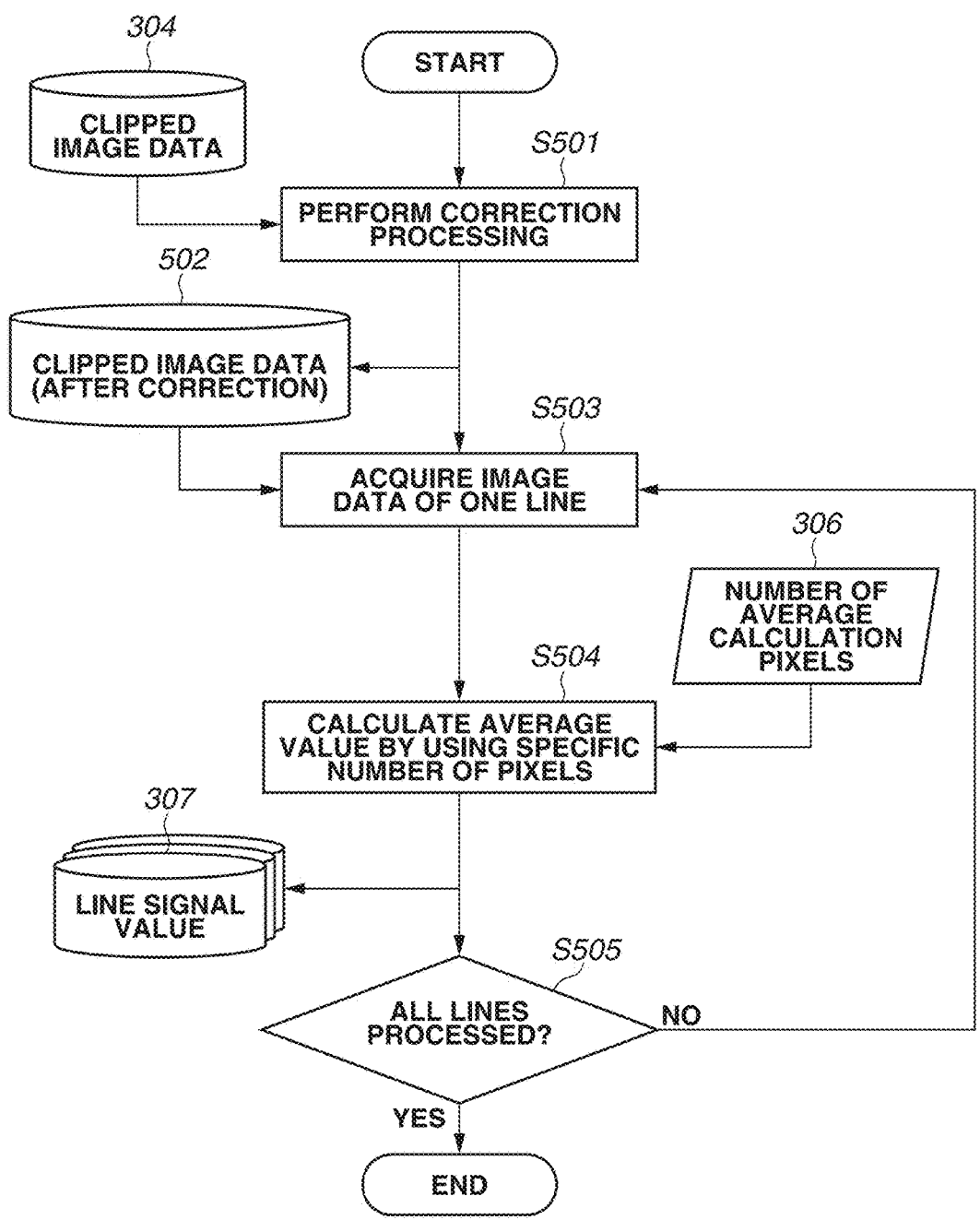

FIG.7A
IMAGE DIAGNOSIS     PAPER SIZE: A4
IMAGE DATA FOR DIAGNOSIS IS DISPLAYED.
CONVEYANCE DIRECTION
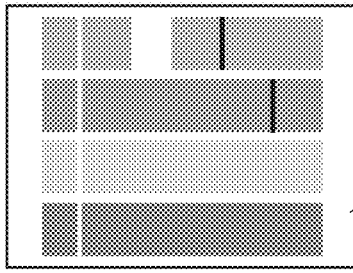
FIG.7B
IMAGE DIAGNOSIS     PAPER SIZE: A4
IMAGE DATA FOR DIAGNOSIS IS DISPLAYED.
CONVEYANCE DIRECTION
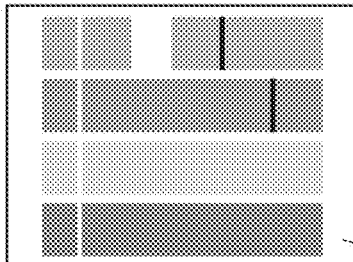 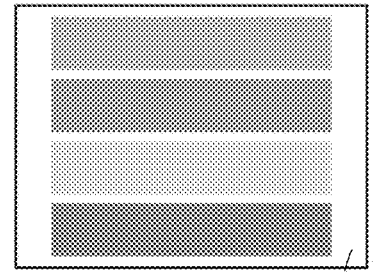
AT IMAGE DIAGNOSIS EXECUTION     AT INSTALLATION

IMAGE PROCESSING APPARATUS, IMAGE PROCESSING METHOD, AND STORAGE MEDIUM

BACKGROUND

Field

Aspects of the present invention generally relate to an image processing apparatus, an image processing method, and a storage medium for analyzing whether a printer has an abnormality.

Description of the Related Art

In recent years, consumer machines, i.e., image processing apparatuses such as printers that implement image quality equivalent to business/industrial printing machines have appeared, as performance of electrophotographic apparatuses has improved. Maintaining high image quality is necessary for operating a consumer printer like a business/industrial printing machine. However, when the consumer printer is used under stress for a long time, the consumer printer can deteriorate, and an image (an abnormal image) different from a normal image could be output. In particular, a "streak" that occurs in a sub scanning or main scanning direction of the consumer printer is a frequent issue.

It is difficult to automatically detect such an "abnormal image" that occurs for a reason such as deterioration by using a sensor, etc. In many cases, an abnormal image is handled after a user notices such an image. It is difficult to express the feature of "abnormal image" in words. For example, even if one says "there is a streak" in an output image, a cause thereof cannot be identified if detailed information such as color and direction in which the streak has occurred, as well as the position and width of the streak.

Therefore, when output of "abnormal image" is pointed out by a user, a service engineer needs to visit the location of the printer in question and to confirm what kind of "abnormal image" was output. The service engineer first checks the abnormal image, and then identifies a relevant service part by estimating a failure part. The service engineer then returns to a service station, picks up the required service part, and returns to the printer location to install the part. Providing such support not only incurs travel costs of the service engineer, but also causes downtime since the printer cannot be used until any repairs are completed, thereby reducing the user's productivity.

Japanese Patent Application Laid-Open No. 2001-203831 discusses a technique where an image is output by a printer to obtain a scanned image thereof, image data of the obtained image is transferred to a remote diagnosis apparatus, and then image diagnosis processing is performed. The image data obtained by scanning the image output from the printer is typically large in size.

Examples of an image quality issues that can frequently occur due to an electrophotographic engine include "streak/unevenness". If a scanner installed on a multi-function printer (MFP) has a reading resolution of, for example, 600 dpi, it can be possible to read a streak at a level at which a user can visually determine the existence of the streak. Therefore, if a scanned image can be directly transmitted to a remote diagnosis apparatus, the presence/absence or state of the streak/unevenness can be determined without a service engineer visiting the location of the printer in question.

However, image data the size of 600 dpi is large, and therefore, resolution conversion/compression is necessary to transmit the image data to the remote diagnosis apparatus. As a result of this processing, information can be lost, resulting in the streak possibly disappearing or being too difficult to view. In addition, if analysis processing for image diagnosis is performed in a state where the information is lost, accuracy thereof can decrease.

SUMMARY

According to an aspect of the present invention, an image processing apparatus includes a clipping unit configured to clip an arbitrary area from image data acquired by reading a chart output from an image forming unit, an acquisition unit configured to acquire a signal value relating to a plurality of positions in a scanning direction of the clipped area, and a transmission unit configured to transmit information about the clipped area and the acquired signal value.

Further features of aspects of the present invention will become apparent from the following description of exemplary embodiments with reference to the attached drawings.

BRIEF DESCRIPTION OF THE DRAWINGS

FIG. 5 is a diagram illustrating a flow of line signal value calculation processing according to the first exemplary embodiment.

FIGS. 7A and 7B are diagrams each illustrating an example of notification of an image diagnosis result according to the first exemplary embodiment.

DESCRIPTION OF THE EMBODIMENTS

Exemplary embodiments of the present invention will be described below with reference to the drawings.

In a first exemplary embodiment, streak detection processing is performed by calculating a line signal value from a scanned image at the time of executing an image diagnosis, and a failed part is estimated from a detection result. A scheme therefor will be described.

Figure 1:
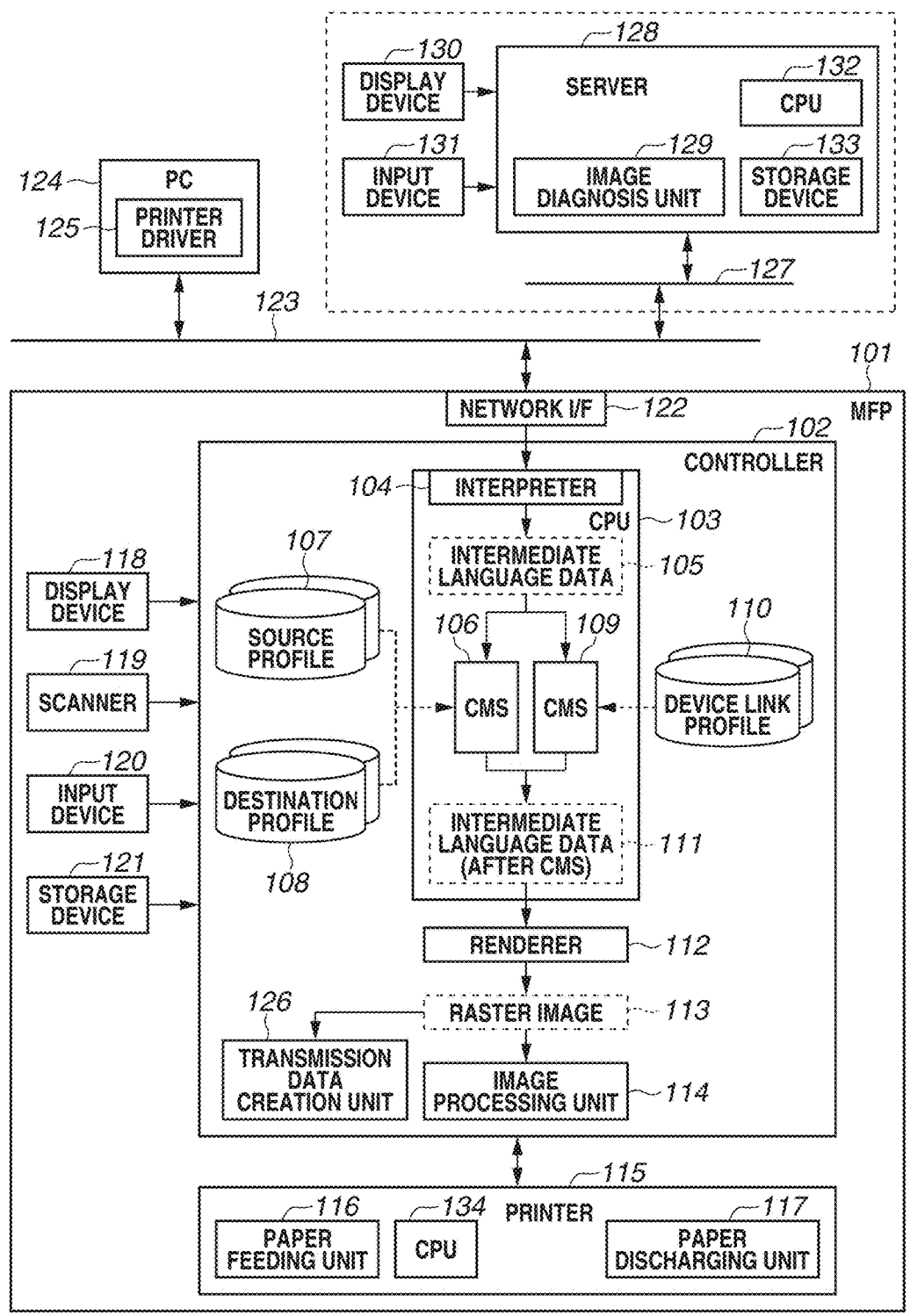
FIG. 1 is a block diagram illustrating a configuration of a system.

FIG. 1 is a block diagram illustrating a configuration of a system according to the present exemplary embodiment. A multi-function printer (MFP) 101, which uses toners of cyan, magenta, yellow, and black (hereinafter referred to as C, M, Y, and K, respectively), is connected to other network-compliant apparatuses via a network 123. In addition, a personal computer (PC) 124 is connected to the MFP 101 via the network 123. A printer driver 125 in the PC 124 transmits print data to the MFP 101.

The MFP 101 will now be described in detail. A network I/F 122 receives data, such as print data. A controller 102 includes a central processing unit (CPU) 103, a renderer 112, and an image processing unit 114. An interpreter 104 of the CPU 103 interprets a page description language (PDL) portion of the received print data and generates intermediate language data 105.

A color management system (CMS) 106 performs color conversion using a source profile 107 and a destination profile 108, and intermediate language data (after CMS) 111 is thereby generated. The CMS 106 performs the color conversion using profile information described below. The source profile 107 is a profile for converting a device-dependent color space, such as RGB and CMYK, into a device-independent color space, such as L*a*b*(hereinafter referred to as Lab) and XYZ as defined by the Commission Internationale de l'Eclairage (CIE). XYZ is a device-independent color space like Lab, and expresses color using three kinds of stimulus values. In addition, the destination profile 108 is a profile for converting a device-independent color space into a CMYK color space depending on a device (a printer 115).

In a CMS 109, color conversion is performed using a device link profile 110, and the intermediate language data (after CMS) 111 is thereby generated. The device link profile 110 is a profile for directly converting a device-dependent color space such as RGB and CMYK into a CMYK color space depending on a device (the printer 115). Selection of a CMS depends on settings in the printer driver 125.

In the present exemplary embodiment, the CMSs (i.e., CMS 106 and the CMS 109) to be used are determined based on the type of the profile (i.e., profiles 107, 108, and 110). One CMS can handle a plurality of types of profiles. In addition, with respect to the type of the profile, if the device-dependent CMYK color space of the printer 115 is used, any type of profiles can be used without being limited to the examples described in the present exemplary embodiment.

The renderer 112 generates a raster image 113 from the generated intermediate language data (after CMS) 111. The image processing unit 114 performs image processing on the raster image 113 and an image read by a scanner 119. The image processing unit 114 is described in detail below.

The printer 115 connected to the controller 102 forms output data on a sheet of paper by using color toners such as C, M, Y, and K. The printer 115 is controlled by a CPU 127. The printer 115 includes a paper feeding unit 116 for feeding a sheet of paper, and a paper discharging unit 117 for discharging paper on which output data is formed.

A display device 118 is a user interface (UI) for displaying an instruction to a user and a status of the MFP 101. In addition to processing such as copying and transmission, the display device 118 transmits data creation processing as described below.

The scanner 119 includes an automatic document feeder. The scanner 119 irradiates a bundle or one of original images with a light source (not illustrated) to form an original reflected image on a solid-state image sensor, such as a charge coupled device (CCD) sensor, with a lens. Subsequently, a raster-like image reading signal is obtained from the solid-state image sensor as image data.

An input device 120 is an interface for receiving input from the user. A part of the input device 120 is a touch panel and therefore is integrated with the display device 118.

A storage device 121 stores data, such as data processed by and received by the controller 102.

A transmission data creation unit 126 converts the raster image 113, which is obtained by scanning an output chart, into data to be transmitted to a server 128, when an output image is an abnormal image. This processing is described in detail below.

The server 128 is an information processing apparatus connected to the MFP 101 via a network 127. The network 127 is connected to the network 123. In the present exemplary embodiment, the server 128 is only connected to the MFP 101, but can manage information associated with a plurality of MFPs. The server 128 includes a CPU 132, a storage device 133, and an image diagnosis unit 129. The server 128 is connected with a display device (display unit) 130 and an input device 131.

The image diagnosis unit 129 performs image diagnosis processing by using data created by the transmission data creation unit 126, and displays a result to a user, such as a service engineer, by using the display device 130. The CPU 132 executes display control of the display device 130. This processing is described in detail below.

Figure 2:
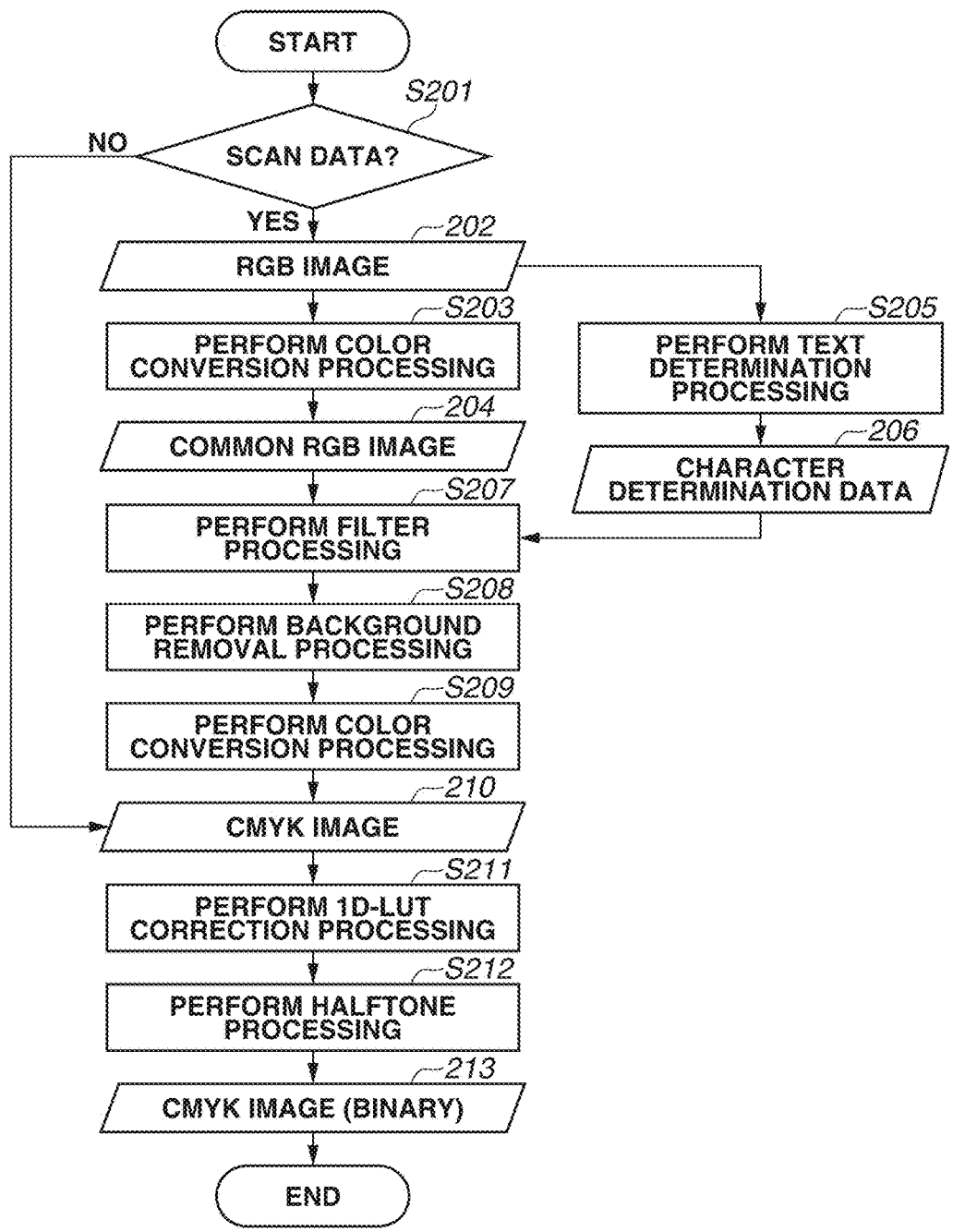
FIG. 2 is a flowchart illustrating a flow of image processing.

Next, a processing flow executed by the image processing unit 114 will be described with reference to FIG. 2. FIG. 2 is a flowchart illustrating a flow of the image processing performed on the raster image 113 and the image read by the scanner 119. The processing flow in FIG. 2 is implemented by an application specific integrated circuit (ASIC) (not illustrated) included in the image processing unit 114.

In step S201, it is determined whether received image data is scan data read by the scanner 119 or the raster image 113 transmitted from the printer driver 125.

When the received image data is not the scan data (NO in step S201), since the received image data is the raster image 113 obtained by bitmap development by the renderer 112, the processing proceeds to step S210 and the subsequent processes are performed using the received image data as a CMYK image 210 obtained by conversion by the CMS into CMYK depending on a printer device.

When the received image data is the scan data (YES in step S201), since the received image data is an RGB image 202, the processing proceeds to step S203. In step S203, color conversion processing is performed, and a common RGB image 204 is generated. The common RGB image 204 is defined in a device-independent RGB color space, and can be converted into a device-independent color space such as Lab.

In step S205, character determination processing is performed and character determination data 206 is generated. The character determination data 206 is generated by detecting, for example, an edge of an image.

Next, in step S207, filter processing is performed on the common RGB image 204, by using the character determination data 206. In the present exemplary embodiment, using the character determination data 206, different types of filter processing are performed on a text portion and other portions of the RGB image 204. Next, in step S208, a background color component is removed by performing background removal processing.

Next, in step S209, the CMYK image 210 is generated by performing color conversion processing. Then, in step S211, tone characteristics of each of monochrome C, M, Y, and K are corrected using a one-dimensional look up table (1D-LUT). The 1D-LUT is provided to correct each color of C, M, Y, and K.

Finally, in step S212, the image processing unit 114 performs image forming processing such as screen processing and error diffusion processing, thereby creating a CMYK image (binary) 213.

Next, the transmission data creation processing according to the present exemplary embodiment will be described with reference to FIG. 3. The transmission data creation processing is performed by, for example, a user of the MFP 101 when an abnormal image is output. The transmission data creation processing is controlled by the transmission data creation unit 126. The processes in step S301 to step S308 are implemented by the CPU 103, and data acquired thereby is stored in the storage device 121. In addition, the display device 118 displays an instruction to the user on a UI, and the input device 120 receives an instruction of the user.

First, in step S301, image data 302 is read, and then clipped image data 304 is created by clipping an area for streak detection. Position/width information 303 associated with the clipped image data 304 is stored. The area clipped from the read-in image data 302 is data of a rectangle parallel to a sheet on which the scanned image data is printed. The length of the rectangle in a direction different from a scanning direction, described below, corresponds to the width. The image data 302 is the raster image 113, which is obtained by processing a chart stored in the storage device 121 with the image processing unit 114, printing the processed chart with the printer 115, and scanning the printed chart by using the scanner 119.

Figure 4A:
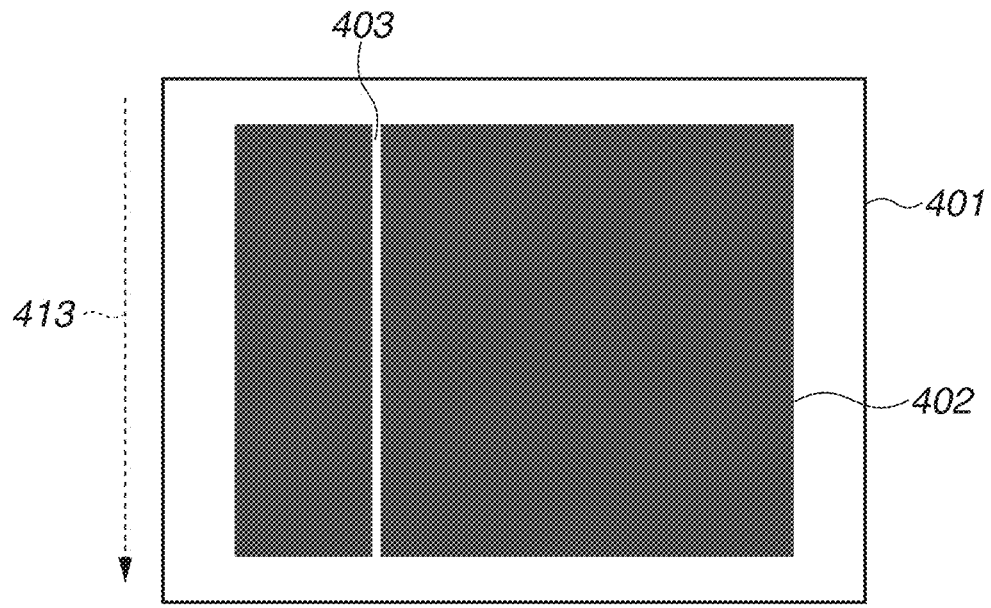
FIGS. 4A and 4B are diagrams each illustrating an example of a chart for streak/unevenness detection according to the first exemplary embodiment.
Figure 4B:
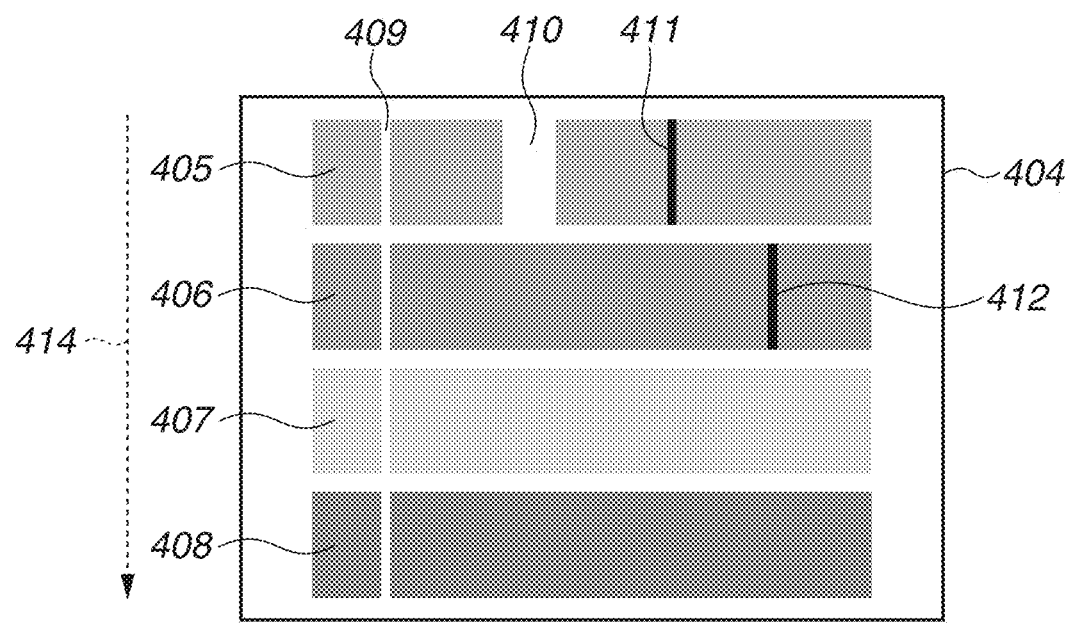

FIGS. 4A and 4B each illustrate an example of the chart. FIG. 4A illustrates a chart for detecting a streak that occurs in a color component of any one of C, M, Y, or K. An area 402 on a sheet 401 is formed of a monochromatic toner having a uniform density. In the present exemplary embodiment, the area 402 can be data of any density. A streak 403 is an abnormal image that occurs due to a failure of a specific part for processing, such as development, transfer, and fixing. Many streaks, which are generated in an electrophotographic printer, occur in a sub scanning direction or a main scanning direction. An arrow 413 represents a paper conveyance direction, i.e., the sub scanning direction. The streak 403 is a streak occurring in the sub scanning direction.

FIG. 4B illustrates a chart for simultaneously detecting streaks of the respective C, M, Y, and K color components. An area 405 on a sheet 404 is formed using the C toner, an area 406 is formed using the M toner, an area 407 is formed using the Y toner, and an area 408 is formed using the K toner. These areas are formed using the respective toners each having a uniform density.

A streak 409 is a low-density streak occurring in all the color components of C, M, Y, and K.

A streak 410 is a large-width low-density streak occurring only in an image area formed using the C toner.

A streak 411 is a high-density streak occurring only in an image area formed using the C toner.

A streak 412 is a high-density streak occurring only in an image area formed using the M toner.

An arrow 414 represents the paper conveyance direction, i.e., the sub scanning direction. Streaks 409 to 412 are streaks that all occur in the sub scanning direction. The chart illustrated in FIG. 4B is a chart for detecting a streak in the sub scanning direction. When a streak in the main scanning direction is to be detected, data can be output by turning FIG. 4B 90 degrees and used as a chart.

The processing flow illustrated in FIG. 3 will be described below assuming that the chart in FIG. 4B is used. In step S301, clipping processing is performed on an image area formed using any of the toners C, M, Y, or K. In this case, the clipping processing is performed while identifying four corners of an area by obtaining a signal value difference between a print area and a sheet. The clipping processing for the area can be any kind of processing.

Next, in step S305, a line signal value 307 is calculated using a number of average calculation pixels 306 (line signal value calculation processing).

Processing for calculating the line signal value 307 will be described using FIG. 5.

Each process in FIG. 5 is implemented by the CPU 103 in the controller 102, and data acquired thereby is stored in the storage device 121.

First, in step S501, correction processing is performed on the clipped image data 304 clipped from the image data, and clipped image data (after correction) 502 is thereby created. In this case, an easily-detectable signal value is generated by correcting gamma characteristics of the scanner 119. The correction processing can be any kind of processing.

Figure 11A:
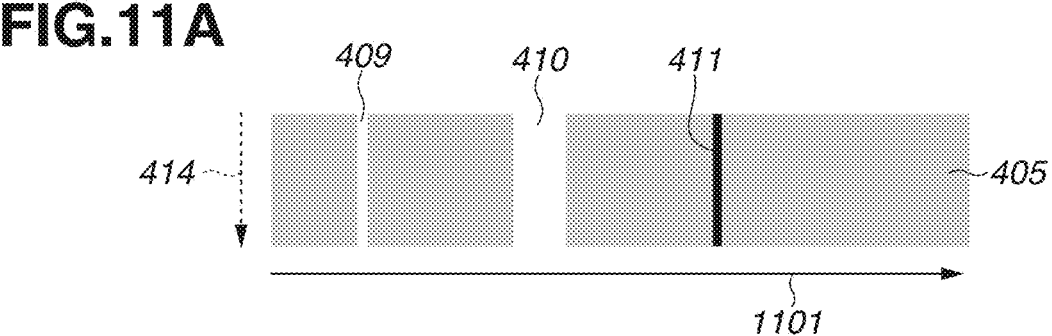
FIGS. 11A, 11B, and 11C are diagrams illustrating an example of a line signal value and an average value difference data according to the second exemplary embodiment.

Next, in step S503, image data of one line is acquired. FIG. 11A illustrates an example. FIG. 11A illustrates the area 405 clipped from FIG. 4B. A streak occurs in parallel with the sub scanning direction 414. The pixel values of pixels on a line parallel to the sub scanning direction 414 in which this streak occurs are acquired in a main scanning direction 1101.

Next, in step S504, the pixel values of the pixels on the read-in specific one line are extracted using the number of average calculation pixels 306, and an average value of the extracted pixel values is calculated for each color component. The calculated average value is stored as the line signal value 307. In the present exemplary embodiment, the image data is an RGB image, and therefore the line signal value 307 is calculated for each of R, G, and B. In this case, the line signal value to be stored is not limited to the average value of the pixel values corresponding to a plurality of pixels. The line signal value to be stored can be any value if the value is equivalent to "representative value", which represents the pixel values of a plurality of pixels on a line, such as "mean value between maximum value and minimum value" and "frequent value".

Finally, in step S505, it is determined whether all the lines are processed. When there is an unprocessed line (NO in step S505), the processes in and after step S503 are repeated.

By performing the above-described processing, when a streak occurs in a direction orthogonal to the main scanning direction (i.e., a direction parallel to the sub scanning direction), an average value of the pixel values of pixels forming a line is acquired for each position in the main scanning direction, i.e., the line signal value is acquired.

This processing is performed from end to end in the main scanning direction. Therefore, the line signal value, which corresponds to each position of the main scanning direction, can be acquired.

Figure 11B:
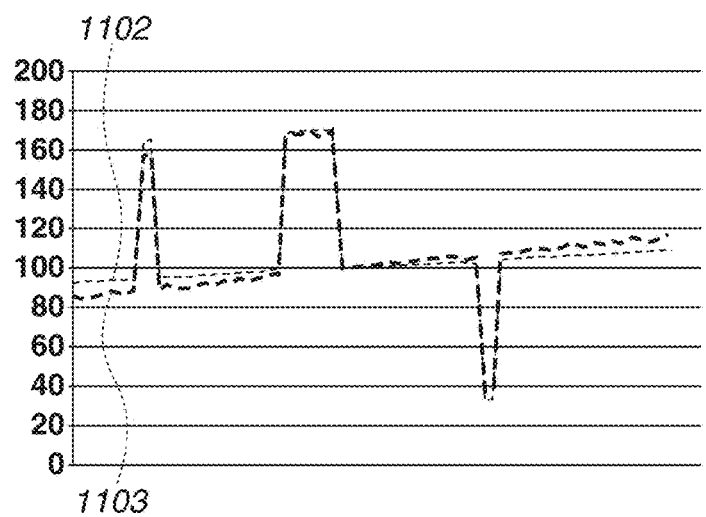

FIG. 11B illustrates an example of the line signal value. A line signal value 1103 is a line signal value in the area 405. A horizontal axis of a graph in FIG. 11B represents the position in the main scanning direction 1101, and a vertical axis represents the calculated average value (the line signal value).

At a location where a low-density streak, such as the streak 409 and the streak 410, occurs, the average value is large. At a location where a high-density streak, such as the streak 411 occurs, the average value is small. A signal value 1102 is a line signal value assuming that unevenness and noise of a scanner are not present. The signal value 1102 indicates a state where only streaks and unevenness of a printer are present.

When influence of unevenness and noise of a scanner are added to the line signal value, the line signal value becomes a value represented by the line signal value 1103, and therefore it is more difficult to detect a streak by using a threshold. The detection of a streak will be described in another exemplary embodiment.

Figure 3:
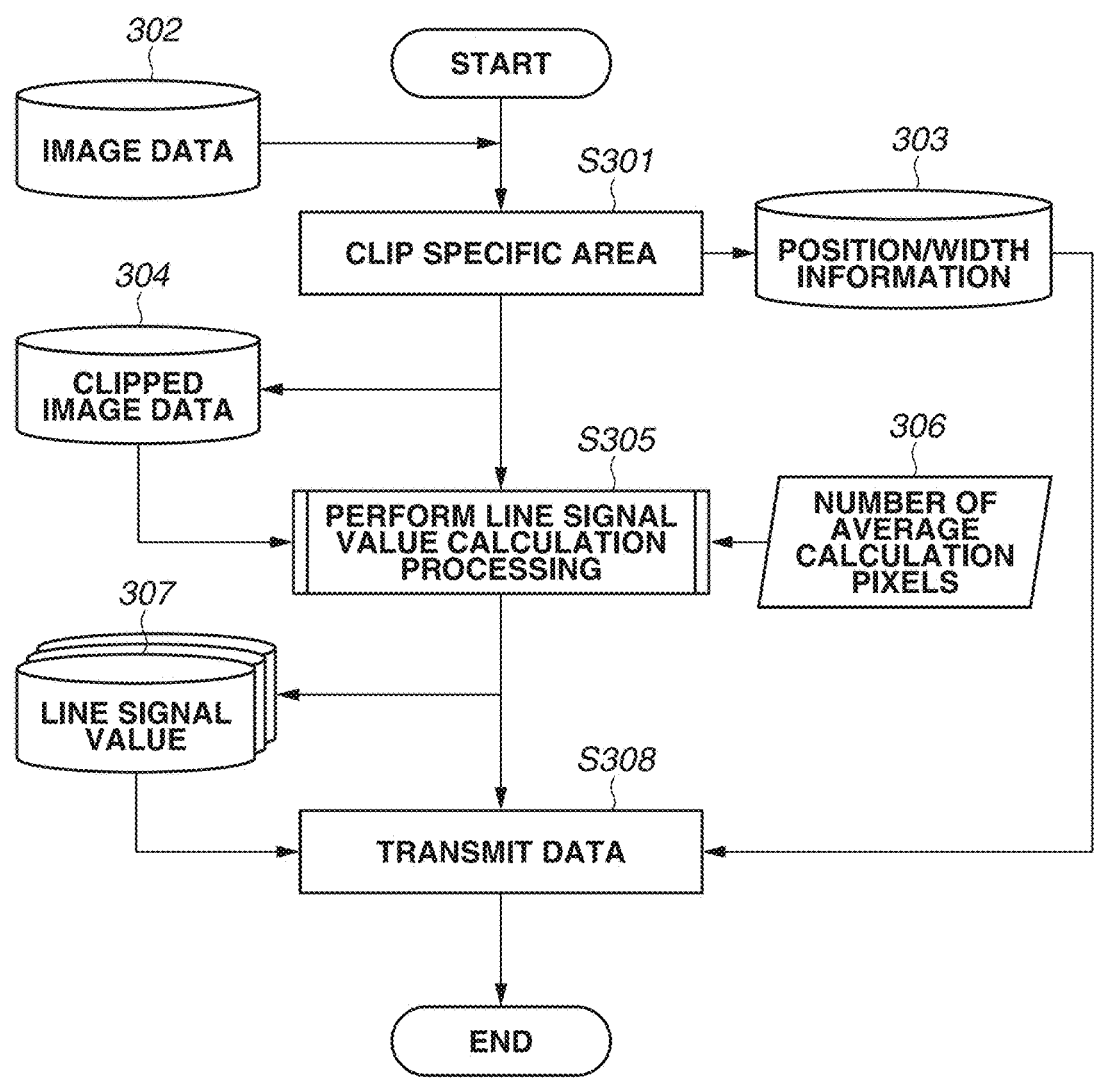
FIG. 3 is a diagram illustrating a flow of transmission data creation processing according to a first exemplary embodiment.

In the flowchart illustrated FIG. 3, after the line signal value calculation processing is performed in step S305, the processing proceeds to step S308. In step S308, the line signal value 307 and the position/width information 303 are transmitted to the server 128.

As described above, instead of the image data itself, the line signal value acquired from the image data is used as a transmission target. Therefore, in the example illustrated in FIG. 11A, the image data of "vertical pixel count×horizontal pixel count" is suppressed to "length of main scanning direction 1101×number of areas". As for image data of 600 dpi and A4 size, about 100 MB data formed of "about 7,000 pixels×about 4,900 pixels" becomes data of about 100 KB or less formed of "about 7,000 pixels×4 areas". In other words, information is compressed to one-1000th or less, and therefore it is easy to transmit and receive the information via the network 123/127 between the MFP 101 and the server 128.

Figure 6:
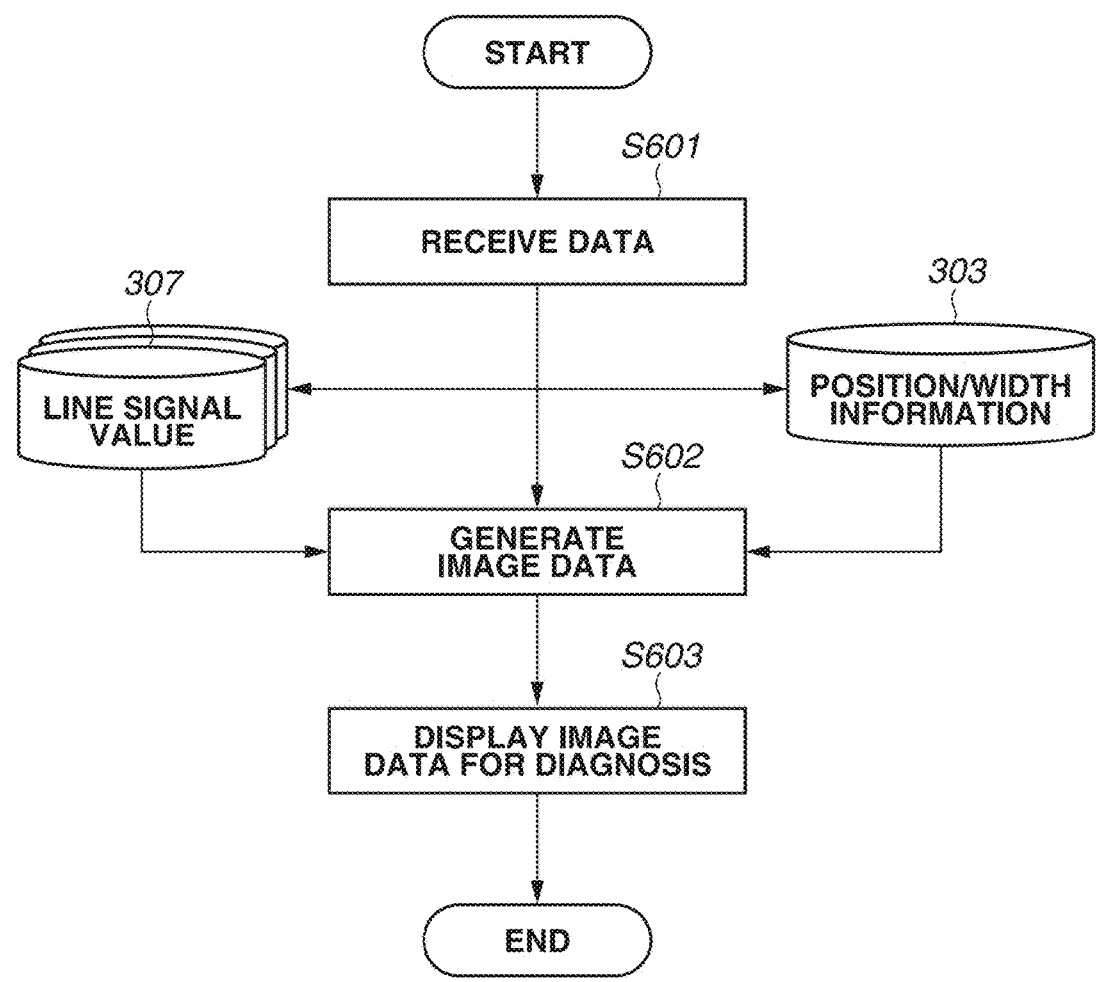
FIG. 6 is a diagram illustrating a flow of image diagnosis processing according to the first exemplary embodiment.

Next, the image diagnosis processing performed by the server 128 will be described with reference to FIG. 6.

The image diagnosis processing creates image data for diagnosis by receiving the line signal value 307 and the position/width information 303. The image diagnosis processing is controlled by the image diagnosis unit 129. The processing in step S601 to step S603 is implemented by the CPU 132 in the server 128, and data acquired thereby is stored in the storage device 133. Further, the display device 130 displays an instruction to the user on a UI, and the input device 131 receives an instruction of the user.

First, in step S601, the line signal value 307 and the position/width information 303 are received.

Next, in step S602, image data is generated using the line signal value 307 and the position/width information 303. More specifically, the line signal value 307 is converted into image data of "length of width information 303×number of line signal values" for each area, and the image data is arranged according to the position/width information 303 for each area.

Finally, in step S603, the created image data is displayed on the display device 130 as the image data for diagnosis. The service engineer views the displayed image data for diagnosis, thereby determining a streak occurrence situation without visiting the location of the printer in question, and can address the occurring streak if necessary.

FIG. 7A illustrates an example of image data for diagnosis. A UI 701 is an interface displaying the image data for diagnosis on the display device 130. Image data 702 is the image data generated in step S602. A streak/unevenness occurs in parallel with the conveyance direction. Therefore, in the image data 702 resulting from the conversion, a streak/unevenness, which is equivalent to that of the image data 302 obtained by scanning, is reproduced. In this way, an effect equivalent to that in transmission of image data of 600 dpi can be obtained with a small amount of information, in the viewpoint of confirmation of streak/unevenness.

The line signal value 307 and the position/width information 303 of a state with no occurrence of streak/unevenness can be transmitted beforehand when the printer is installed, and an image based thereon can be displayed for comparison with an image at the time of occurrence of a streak. FIG. 7B illustrates an example. A UI 703 is an interface displaying the image data for diagnosis on the display device 130. Image data 705 with no occurrence of streak/unevenness is displayed beside image data 704 generated in step S602 at occurrence of streak/unevenness. This enables the service engineer to easily determine the situation at a remote site. The image data 705 is data obtained by converting the line signal value 307 and the position/width information 303 in step S602, which are stored in the storage device 133 of the server 128 after being acquired by the MFP 101 at installation and then transmitted to the server 128.

According to the present exemplary embodiment, when "streak/unevenness" occurs in a printer, it is possible to transmit image data of a data amount smaller than that when image data with a scan resolution is transmitted to an image diagnosis unit. Further, with the image diagnosis unit, a new image is generated using the transmitted image data, and the generated new image is displayed. It is therefore possible to display an image that provides an effect, which is equivalent to that of an image generated using the image data with the scan resolution, for a purpose of confirming the streak/unevenness.

Therefore, it is possible to generate an image enabling easy detection of a streak/unevenness with a small amount of data, so that a service engineer can accurately understand an image quality issue without visiting the location of the printer in question.

Next, a second exemplary embodiment will be described. In the second exemplary embodiment, streak detection and/or failed-part estimation is performed after receiving a line signal value and position/width information, and a service engineer is notified of a result thereof.

In the scheme described in the first exemplary embodiment, the image data is converted into the line signal value with a small amount of information in the MFP 101, and the line signal value is transmitted to the server 128. Further, in the server 128, the line signal value is converted into the image data, and the image for diagnosis is displayed.

However, it is necessary for the service engineer to determine the situation and any required support by viewing the image data. An experienced service engineer can easily address the situation, but for an inexperienced service engineer, the determination could be more difficult.

Under the above-described circumstances, an example where streak detection and/or failed-part estimation is performed using a line signal value and a service engineer is provided associated notification will be described in the second exemplary embodiment.

The processing flow of the present exemplary embodiment includes creating and transmitting a line signal value and position/width information to the server 128 similar to that in the first exemplary embodiment, and therefore will not be described. In the present exemplary embodiment, image diagnosis processing of the server 128 is different from that of the first exemplary embodiment.

Figure 8:
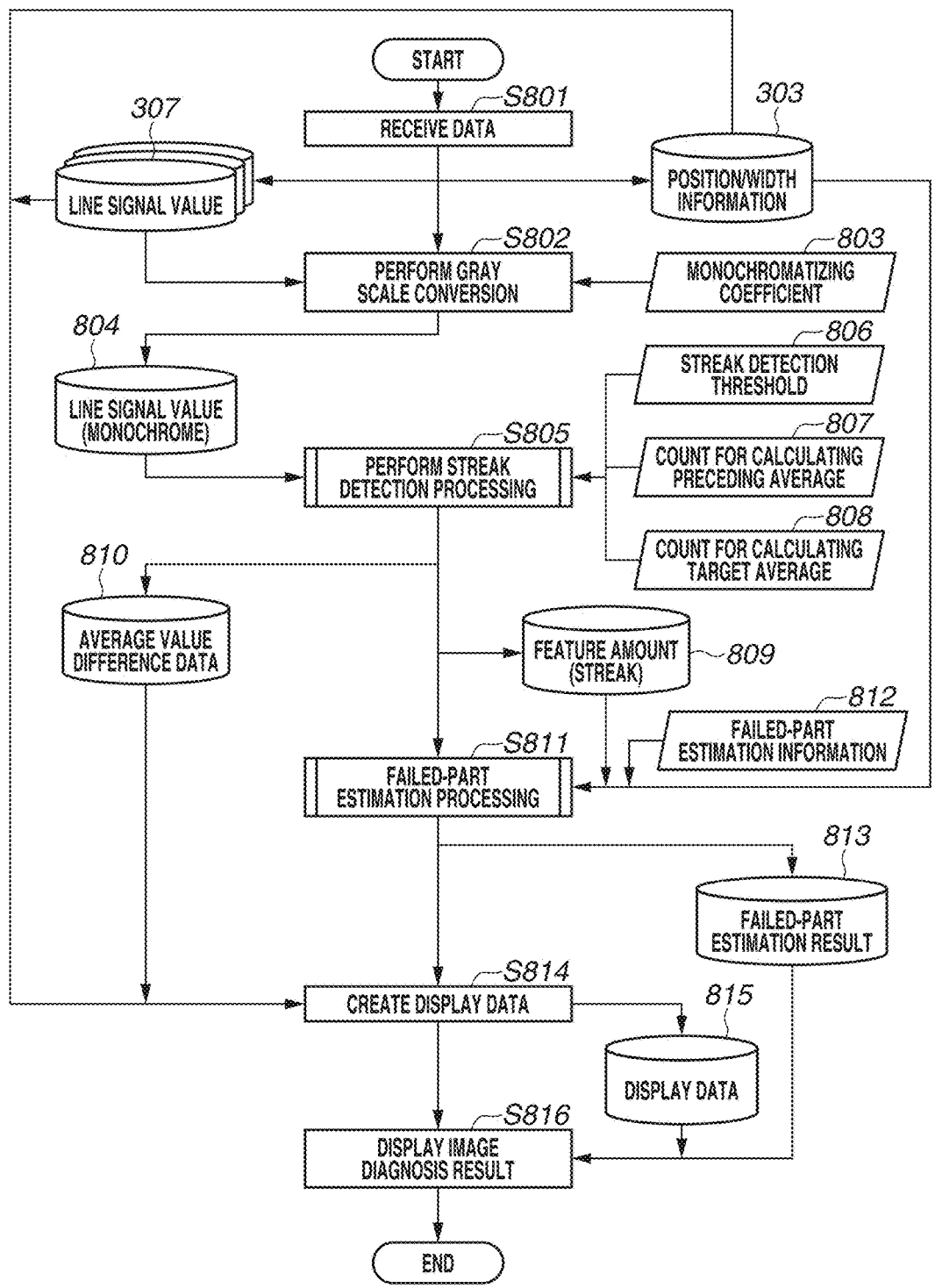
FIG. 8 is a diagram illustrating a flow of image diagnosis processing according to a second exemplary embodiment.

The image diagnosis processing to be performed in the server 128 will be described with reference to FIG. 8. In the image diagnosis processing, a line signal value 307 and position/width information 303 are received to generate image data for diagnosis, and the image diagnosis processing is controlled by an image diagnosis unit 129. Step S801 to step S816 of the processing flow of FIG. 8 are implemented by the CPU 132 in the server 128, and the acquired data is stored in the storage device 133. In addition, the display device 130 displays an instruction to a user on a UI, and the input device 131 receives an instruction of the user.

First, in step S801, the line signal value 307 and the position/width information 303 are received. Next, in step S802, gray scale conversion is performed using a monochromatizing coefficient 803 on the line signal value 307 of each of R, G, and B, and a monochromatized line signal value 804 is output. In this case, a different monochromatizing coefficient 803 is used for each area (color). In the present exemplary embodiment, the monochromatizing coefficient 803 is assumed to include coefficients respectively used to add signal levels of R, G, and B each at a predetermined ratio, but can include coefficients used to add signal levels of any combination of R, G, and B each at a predetermined ratio.

Next, in step S805, streak detection processing is performed using the monochromatized line signal value 804, and a streak feature amount 809 and average value difference data 810 are output. This processing uses a predetermined streak detection threshold 806, a number 807 for calculating preceding average, and a number 808 for calculating target average.

The streak detection processing of step S805 will be described in detail with reference to FIG. 9.

First, in step S901, correction processing is performed by reading the monochromatized line signal value 804, thereby calculating a line signal value 902 after correction. The correction processing is processing for removing noise by using a moving average, etc. However, it is not limited thereto, and the correction processing can be any kind of processing.

Next, in step S903, of the line signal values 902 acquired for respective positions of the main scanning direction, a line signal value, which is acquired for each target position (a first position) that is an arbitrary position in the main scanning direction, is extracted.

Next, in step S904, a line signal value corresponding to each of positions successive in the main scanning direction is read using the number 808 for calculating target average.

The number 808 for calculating target average is a value indicating how many pixels corresponding to the line signal values at the positions successive in the main scanning direction is to be read.

Figure 12A:
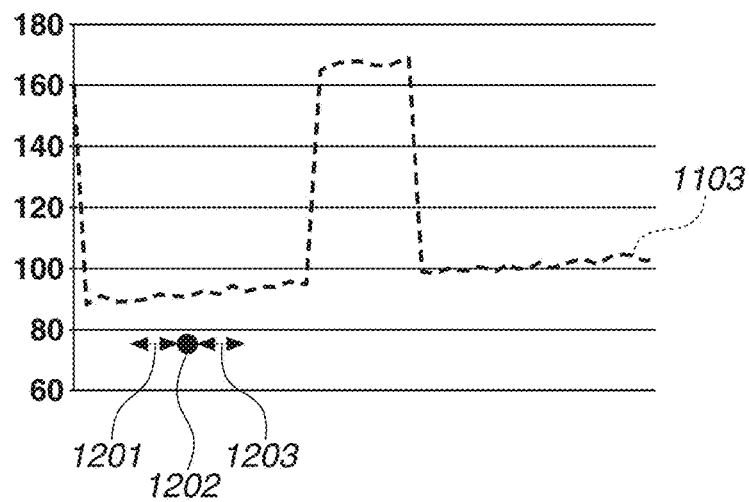
FIGS. 12A, 12B, and 12C are diagrams illustrating an example of processing for calculating a prior average value and a target average value according to the second exemplary embodiment.

In step S905, an average value of the read-in line signal values is output as a target average value 906. FIG. 12A illustrates an example. A horizontal axis of a graph in FIG. 12A represents the target position in the main scanning direction, and a vertical axis represents the calculated line signal value. FIG. 12A illustrates a target position 1202 in the main scanning direction. Signal values 1203 correspond to positions after the target position 1202 in the main scanning direction, and are successive signal values at the respective positions in a predetermined range. The target average value 906 of the signal values 1203 is an average value of line signal values corresponding to the respective positions. The target average value 906 can be an average value of line signal values corresponding to the respective positions in any range in the scanning direction if the positions are located after the target position 1202 (positions to be scanned after the target position 1202).

Therefore, the average can be obtained from values corresponding to positions away from the target position. When an average value of line signal values corresponding to the respective positions away from the target position is acquired, a streak having a moderate change amount is readily detected. When an average value of line signal values corresponding to the respective positions close to the target position is acquired, it is easy to detect a streak without being affected by in-plane unevenness of a printer or in-plane unevenness and/or noise of a scanner.

The above-described processing is not limited to the average value of the line signal values, and any value can be used if the value corresponds to "representative value" that is one value representing a plurality of signal values. The representative value can be "mean value between maximum value and minimum value" or "frequent value" of signal values corresponding to the respective positions in the main scanning direction. Values can be discretely acquired in a range after the target position.

Next, in step S907, it is determined whether the current state is a state where a streak is detected at the target position with reference to a streak detection status 914. In a state at the start of the processing, no streak is detected.

When it is determined that the current state is a state where a streak is not detected at the target position (NO in step S907), the processing proceeds to step S908. In step S908, it is determined whether a preceding average can be calculated by reading the number 807 for calculating preceding average. The preceding average is an average of successive signal values at the respective positions in a predetermined range before the target position 1202 (positions to be scanned before the target position 1202).

The number 807 for calculating preceding average is a value indicating how many pixels corresponding to the line signal values at the positions successive in the main scanning direction is to be read.

For example, when the target position is at an end of the scan position, no preceding pixel value is present. Therefore, in this case, the preceding average cannot be calculated. When the preceding average cannot be calculated (NO in step S908), the target position is changed and the processes in and after step S903 are repeated.

When it is determined that the preceding average can be calculated (YES in step S908), the processing proceeds to step S909. In step S909, successive signal values preceding the target position are read by using the number 807 for calculating preceding average. Next, in step S910, a preceding average value 911 is calculated. FIG. 12A illustrates an example. FIG. 12A illustrates the target position 1202 in the main scanning direction. Signal values 1201 represent successive signal values at the respective positions before the target position 1202 in the main scanning direction. The preceding average value 911 of the signal values 1201 at the respective positions is the preceding average value. The preceding average value 911 can be an average value of line signal values at the respective positions in any range in the scanning direction if the positions are located before the target position 1202. Therefore, values obtained at positions away from the target position can be used.

The above-described processing is not limited to the average value of the line signal values, and any value can be used if the value corresponds to "representative value" that is one value representing a plurality of signal values. The representative value can be "mean value between maximum value and minimum value" or "frequent value" of signal values obtained at the respective positions in the main scanning direction. Values can be discretely acquired in a range before the target position.

Next, in step S912, a difference between the target average value 906 and the preceding average value 911 is calculated, and then the calculated difference is output as the average value difference data 810.

Next, in step S913, streak determination processing is performed using the average value difference data 810 and the streak detection threshold 806, and a streak detection result 915 is output. When the average value difference data 810 exceeds the streak detection threshold 806, it is determined that a streak is detected, and this result is reflected on the streak detection status 914. When the average value difference data 810 is the less than or equal to the streak detection threshold 806, it is determined that no streak is detected, and this result is reflected on the streak detection status 914.

Next, in step S916, it is determined whether all the lines are processed. When there is an unprocessed line (NO in step S916), the target position is changed and the processes in and after step S903 are repeated. When all the lines are processed (YES in step S916), the processing ends.

When it is determined, with reference to the streak detection status 914, that the current state is a state where a streak is detected (YES in step S907), the processing proceeds to step S912, without calculating the preceding average value 911. In step S912, processing for calculating a difference is performed using the preceding average value 911 at the time of the streak detection.

As described above, it is determined in step S907 whether the current state is a state where a streak is detected, and whether to calculate the preceding average value 911 is switched according to a result of this determination. This is described in more detail with reference to FIGS. 12A to 12C.

FIG. 12A illustrates a state where no streak is detected at the target position 1202. A target average value 906 of signal values 1203 and a preceding average value 911 of signal values 1201 are calculated with respect to the target position 1202 to obtain a difference. Since no streak occurs before and after the target position 1202, the difference is a small value equal to the threshold or less.

Figure 12B:
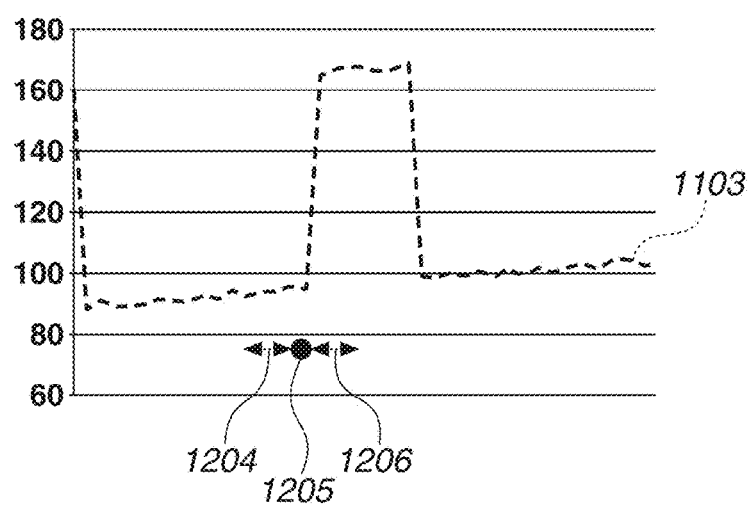

FIG. 12B also illustrates a state where no streak is detected at a target position 1205. A target average value 906 of signal values 1206 and a preceding average value 911 of signal values 1204 are calculated with respect to the target position 1205, to calculate a difference. Since a streak occurs after the target position 1205, the difference is a large value exceeding the threshold. Therefore, after the target position 1205, the state becomes a "state where a streak is detected".

Figure 12C:
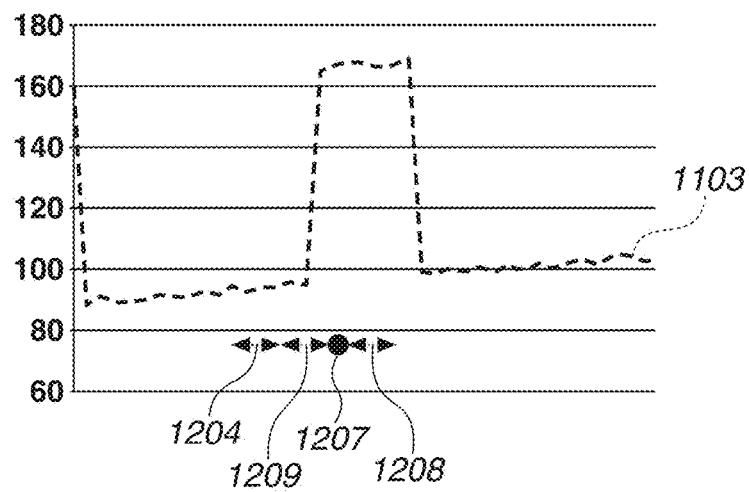

FIG. 12C illustrates a state where a streak is detected at a target position 1207. A target average value 906 of signal values 1208 is calculated with respect to the target position 1207. The preceding average value 911 of signal values 1204 at the time of the streak detection, not a preceding average value 911 of signal values 1209 obtained from a range after the streak is detected, is calculated. A difference is then determined. Since the state having the streak still continues after the target position 1207, the difference is a large value exceeding the threshold.

When the position at which no streak occurs is at the target position, the difference between the target average value 906 and the preceding average value 911 is small. In that case, it is determined that no streak occurs, and afterward, the state becomes a "state where no streak is detected", and the subsequent processes are repeated.

Based on the above processing, the preceding average value 911 to be used for calculation of the difference is switched depending on whether the current state is a state where a streak is detected (the value used before the streak detection is used as the preceding average value, for the area after the streak detection). Therefore, the width of the streak can be accurately detected.

Figure 11C:
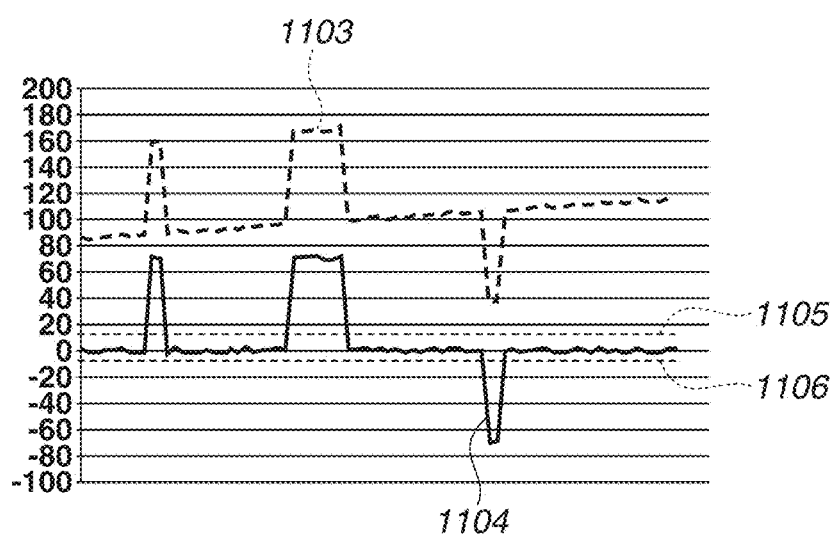

Data 1104 in FIG. 11C represents the average value difference data 810. A difference value is close to 0 at a point with no streak and significantly far from 0 at a position with occurrence of a streak. A light streak is represented by a positive number, whereas a dark streak is represented by a negative number. A higher limit threshold 1105 and a lower limit threshold 1106 correspond to the streak detection threshold 806. The difference greater than the higher limit threshold 1105 is determined to be a light steak, whereas the difference less than the lower limit threshold 1106 is determined to be a dark streak. The higher limit threshold 1105 and the lower limit threshold 1106 can each be a predetermined value, or can each be a value different depending on color (CMYK).

Figure 9:
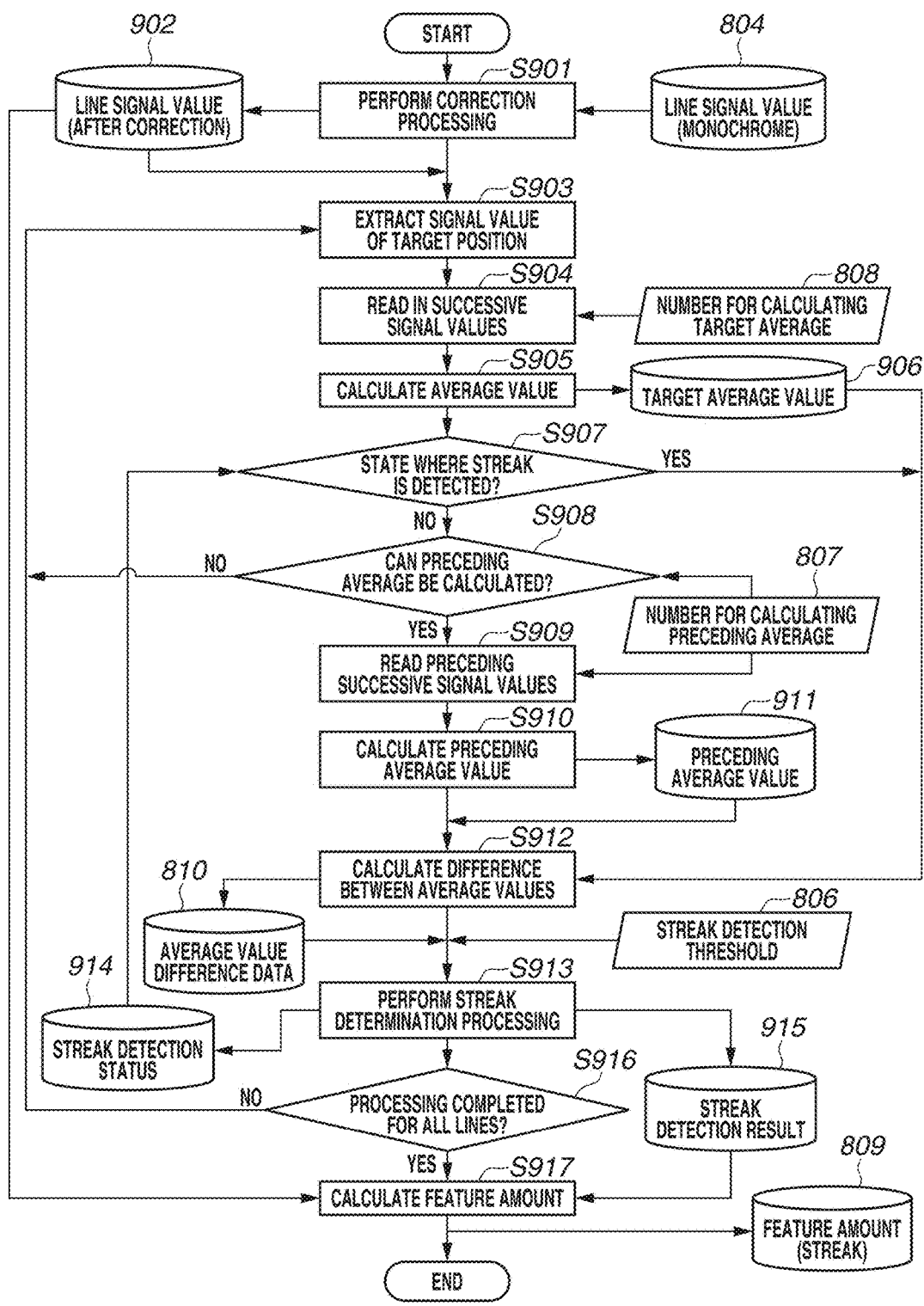
FIG. 9 is a diagram illustrating a flow of streak detection processing according to the second exemplary embodiment.

Finally, in step S917 in the flowchart illustrated in FIG. 9, the streak feature amount 809 is calculated using the line signal value 902 after correction and the streak detection result 915. The position, width, density, signal value, etc., of the streak form the feature amount.

When the line signal values are configured of a plurality of areas, the streak detection processing in step S805 is performed for all the areas.

Returning to FIG. 8, after the streak detection processing in step S805 in is performed, the processing proceeds to step S811. In step S811, failed-part estimation processing is performed using the position information 303, the streak feature amount 809, and failed-part estimation information 812, and a failed-part estimation result 813 is output.

Figure 10:
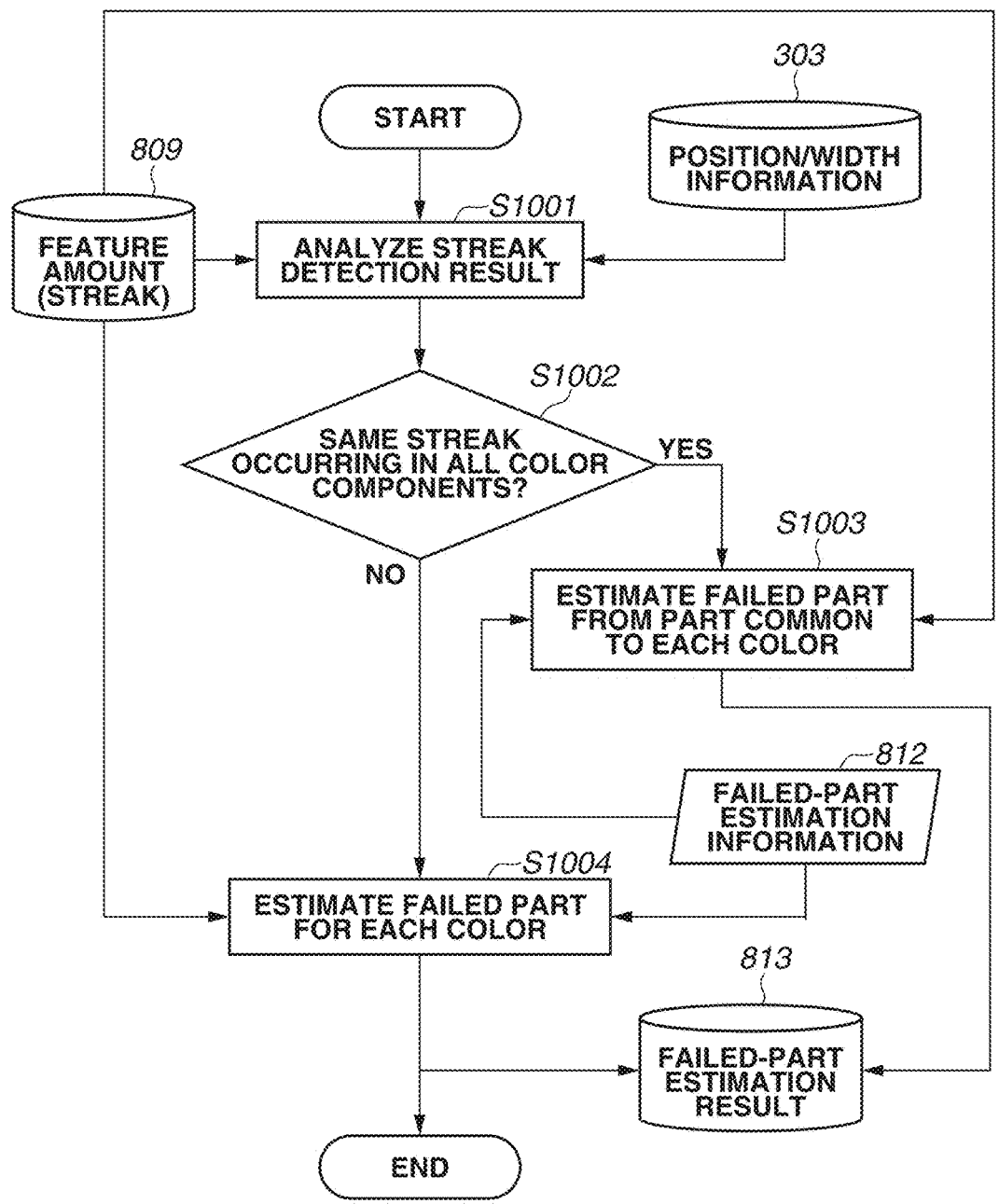
FIG. 10 is a diagram illustrating a flow of failed-part estimation processing according to the second exemplary embodiment.

The failed-part estimation processing will be described with reference to FIG. 10. First, in step S1001, the streak feature amount 809 and the position information 303 are read to analyze a streak detection result. The width, position, and density of the streak detected in each of the areas are used to determine whether a streak having the same feature has occurred in a plurality of areas. The position information 303 is used to calculate the accurate position by removing influence such as a color shift of each plate at the time of printing.

Next, in step S1002, it is determined whether the same streak has occurred in all the color components. When it is determined that the same streak has occurred in all the color components (YES in step 1002), the processing proceeds to step S1003. In step S1003, a failed part is estimated from the streak feature amount 809 and the failed-part estimation information 812. In the failed-part estimation information 812, parts of the printer 115 and feature amounts at the time of failure are associated with each other and stored. In step S1003, a failed part is estimated with reference to parts not depending on fixing and color of, for example, a transfer drum (common parts used when an image is formed using each color toner), and then a result thereof is output as the failed-part estimation result 813.

When it is determined that the same streak has not occurred in all the color components (NO in step 1002), the processing proceeds to step S1004. In step S1004, a failed part is estimated for each color from the streak feature amount 809 and the failed-part estimation information 812. A failed part is estimated with reference to parts depending on color of, for example, a developing unit, in the failed-part estimation information 812, and then a result thereof is output as the failed-part estimation result 813.

When a chart is not configured for each color component as in FIG. 4A, the determination processing in step S1002 is not performed, and the failed-part estimation processing is performed only for the relevant color component.

Returning to FIG. 8, after the failed-part estimation processing in step S811 is performed, the processing proceeds to step S814. In step S814, display data 815 is created using the line signal value 307, the average value difference data 810, and the position/width information 303. Similarly in step S602, conversion to image data is performed using the line signal value 307 and the position/width information 303. In addition, graph data is created using the line signal value 307 and the average value difference data 810.

Finally, in step S816, an image diagnosis result is displayed using the failed-part estimation result 813 and the display data 815.

Figure 13:
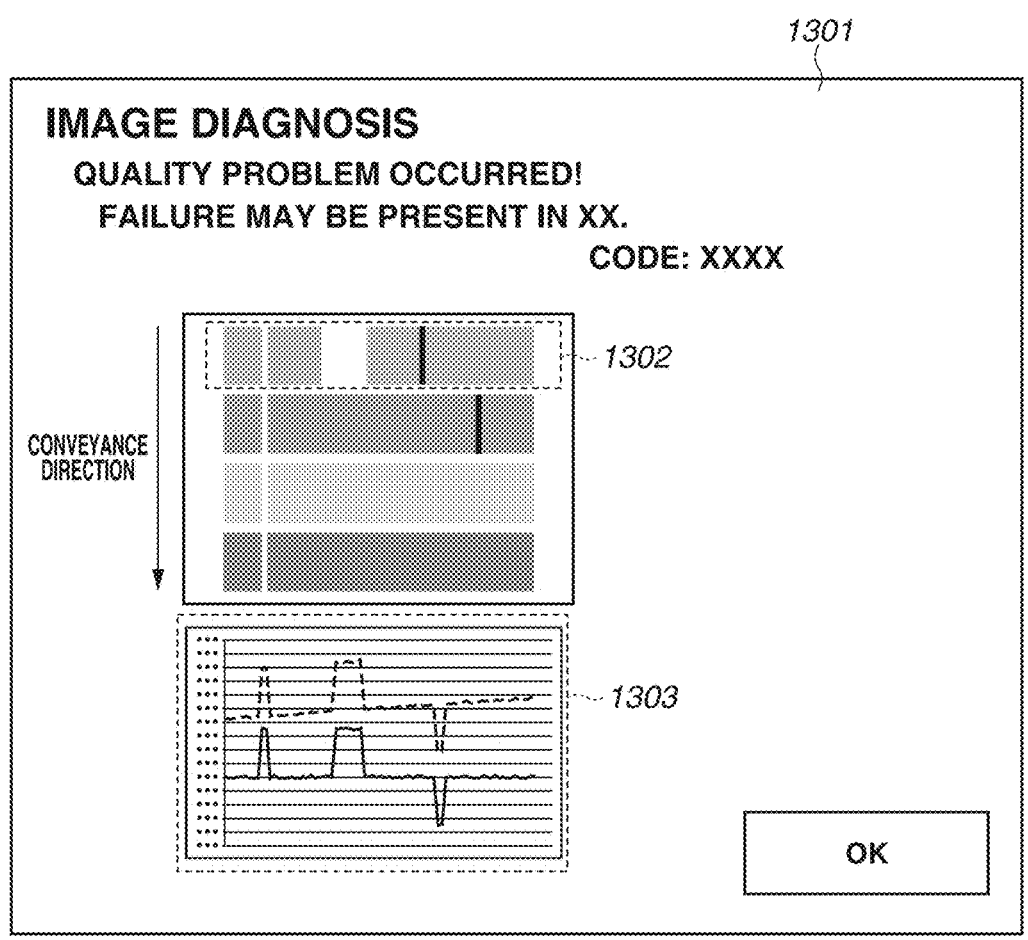
FIG. 13 is a diagram illustrating an example of notification of an image diagnosis result according to the second exemplary embodiment.

FIG. 13 illustrates an example of the display. A UI 1301 is an example displayed on the display device 130. As a result of the image diagnosis, a part that may have failed and a corresponding code are displayed. A service engineer viewing the displayed diagnosis result or code can determine the presence/absence of a failure and conceive a solution beforehand without visiting the location of the printer in question. The information to be displayed on the UI 1301 can be any type of information, such as detailed information of a streak, without being limited to the examples in the present exemplary embodiment.

The image data 1302 is the image data obtained by the conversion using the line signal value 307 and the position/width information 303 in step S814. A graph 1303 is created using the line signal value 307 and the average value difference data 810. The display data 815 and the UI 1301 can be any type, such as displaying a streak detection result using the streak feature amount 809, without being limited to the example in the present exemplary embodiment. Image data and/or graph of a normal state at installation can be simultaneously displayed, as in FIG. 7B.

In the present exemplary embodiment, the pre-determined streak detection threshold is used. However, a device with no streak occurrence can be scanned, and a threshold can be calculated from a line signal value thereof. In the present exemplary embodiment, a failed part is estimated using division according to the flowchart, but, for example, estimation processing using learning data such as Bayesian estimation can be performed. In the present exemplary embodiment, a failed part is estimated by detecting a streak from the line signal value 307, but a failed part can be estimated by detecting unevenness.

According to the present exemplary embodiment, when "streak/unevenness" occurs in a printer, it is possible to transmit, to an image diagnosis unit for example, image data of a data amount smaller than that when image data with a scan resolution is transmitted. Further, in the image diagnosis unit, a new image is generated using the transmitted image data, and the newly generated image is displayed. It is therefore possible to display an image that provides an effect, which is equivalent to that of an image generated using the image data with the scan resolution, for a purpose of confirming the streak/unevenness.

Therefore, it is possible to generate an image enabling easy detection of a streak/unevenness with a small amount of data, so that a service engineer can accurately understand an image quality problem, without visiting the location of the printer in question.

According to the present exemplary embodiment, a failed part can be estimated by detecting a streak/unevenness and then a service engineer can be notified of the estimation result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-173287, filed Sep. 2, 2015, which is hereby incorporated by reference herein in its entirety.

What is claimed is:

1. An image processing apparatus which has an image forming unit, comprising:
   a controller including a memory storing instructions and a processor which executes the instructions to cause the controller to implement:
      a clipping unit configured to clip an arbitrary area from image data acquired by reading a chart output from the image forming unit;
      an acquisition unit configured to acquire a signal value relating to a plurality of positions in a scanning direction of the clipped area; and
      a transmission unit configured to transmit information about the clipped area and the acquired signal value.

2. The image processing apparatus according to claim 1, wherein the information about the clipped area is a position and a width of the area clipped from the image data.

3. The image processing apparatus according to claim 1, wherein the acquired signal value is an average value of pixel values of a plurality of pixels aligned in a direction orthogonal to the scanning direction of the clipped area.

4. An information processing apparatus comprising:
   a receiving unit configured to receive information about an area clipped from image data and a signal value relating to a plurality of positions in a scanning direction of the clipped area;
   a generation unit configured to generate image data using the information about the clipped area and the signal value, and
   a display control unit configured to cause a display unit to display the generated image data.

5. The image information apparatus according to claim 4, further comprising an image diagnosis unit configured to detect a streak or unevenness included in the clipped data using the signal value and the information about the clipped area and to estimate a failed part using a result of the detection, wherein the display control unit causes the display unit to display the result of the detection or a result of the estimation.

6. The image information apparatus according to claim 4, further comprising an image diagnosis unit configured to detect a streak and/or unevenness included in the clipped data using the signal value and the information about the clipped area, create an image of the clipped data and the streak and/or unevenness included in the clipped data, wherein the display control unit causes the display unit to display the created image.

7. A control method for an image processing apparatus which has an image forming unit, comprising:
   clipping an arbitrary area from image data acquired by reading a chart output from the image forming unit;
   acquiring a signal value relating to a plurality of positions in a scanning direction of the clipped area; and
   transmitting information about the clipped area and the acquired signal value.

8. A non-transitory computer-readable storage medium storing computer-executable instructions that cause a computer to execute a control method for an image processing apparatus which has an image forming unit, comprising:
   clipping an arbitrary area from image data acquired by reading a chart output from the image forming unit;
   acquiring a signal value relating to a plurality of positions in a scanning direction of the clipped area; and
   transmitting information about the clipped area and the acquired signal value.

9. A control method for an information processing apparatus comprising:
   receiving information about an area clipped from image data and a signal value relating to a plurality of positions in a scanning direction of the clipped area;
   generating image data using the information about the clipped area and the signal value, and
   displaying the generated image data.

10. A system comprising:
    an image processing apparatus which has an image forming unit; and
    an information processing apparatus,
    wherein the image processing apparatus comprises:
       a clipping unit configured to clip an arbitrary area from image data acquired by reading a chart output from the image forming unit,
       an acquisition unit configured to acquire a signal value relating to a plurality of positions in a scanning direction of the clipped area, and
       a transmission unit configured to transmit information about the clipped area and the acquired signal value, and
    wherein the information processing apparatus comprises:
       a receiving unit configured to receive information about an area clipped from image data and a signal value relating to a plurality of positions in a scanning direction of the clipped area;
       a generation unit configured to generate image data using the information about the clipped area and the signal value, and
       a display control unit configured to cause a display unit to display the generated image data.

* * * * *